April 12, 1960

T. WILFERT 2,932,814

BLINKING DEVICE FOR MOTOR VEHICLES

Filed Feb. 23, 1954

INVENTOR.
THOMAS WILFERT.

BY Dicke and Craig.

ATTORNEYS.

April 12, 1960

T. WILFERT 2,932,814

BLINKING DEVICE FOR MOTOR VEHICLES

Filed Feb. 23, 1954

INVENTOR.
THOMAS WILFERT
BY
Dicke & Craig
ATTORNEYS

United States Patent Office 2,932,814
Patented Apr. 12, 1960

2,932,814
BLINKING DEVICE FOR MOTOR VEHICLES

Thomas Wilfert, Stuttgart-Degerloch, Germany, assignor to Daimler-Benz Aktiengesellschaft, Stuttgart-Unterturkheim, Germany Application February 23, 1954, Serial No. 412,030

Claims priority, application Germany February 25, 1953

8 Claims. (Cl. 340—76)

The present invention relates to a light-signalling arrangement for motor vehicles with a blinking device or flasher, wherein the headlamps are used in connection with the flasher to emit a light signal simultaneously by both headlamps to the preceding vehicle.

The use of headlamps for emitting light signals, especially during overtaking while driving at night, has become more and more widespread and accepted because acoustic signals often remain unnoticed, particularly by truck drivers. In that case, the headlamps are operated by the conventional means provided therefor, that is to say, by intermittently operating the hand or foot dimmer switch.

It is, accordingly, an object of the present invention to simplify the actuation of the blinking device or flasher by the driver of the vehicle.

The present invention consists of a separate blinking switch operated by the driver of the vehicle which produces automatically an intermittently appearing optical signal when switched on, i.e., upon closure thereof. In connection therewith, the optical signal appropriately consists of blinking, i.e., turning on for a short time the upper or undimmed beams of the headlights used for country driving. However, the optical signal may also consist of turning on for a short time the lower or dimmed beams of the headlamps if the headlamps are previously turned off or set to a position corresponding to the parking lights. It is particularly appropriate that the energization or turning on of the upper beams of the headlight as an optical signal results upon actuation of the blinking device when the headlights are adjusted to any position beforehand other than the position corresponding to the upper beams or undimmed headlights, for example, also from the position corresponding to the lower beams or dimmed headlights.

In order to simplify the actuation of the blinking switch, the latter is appropriately arranged at the steering column of the motor vehicle so that it may easily be reached by one of the driver's hands controlling the steering wheel.

Further objects, advantages, and features of the present invention will become more obvious from the following description when taken in connection with the accompanying drawing which shows, for purposes of illustration only, two embodiments in accordance with the present invention, and wherein Figure 1 is a schematic illustration of the blinker or flasher-type light signal arrangement for a motor vehicle in accordance with the present invention;

Figure 1:
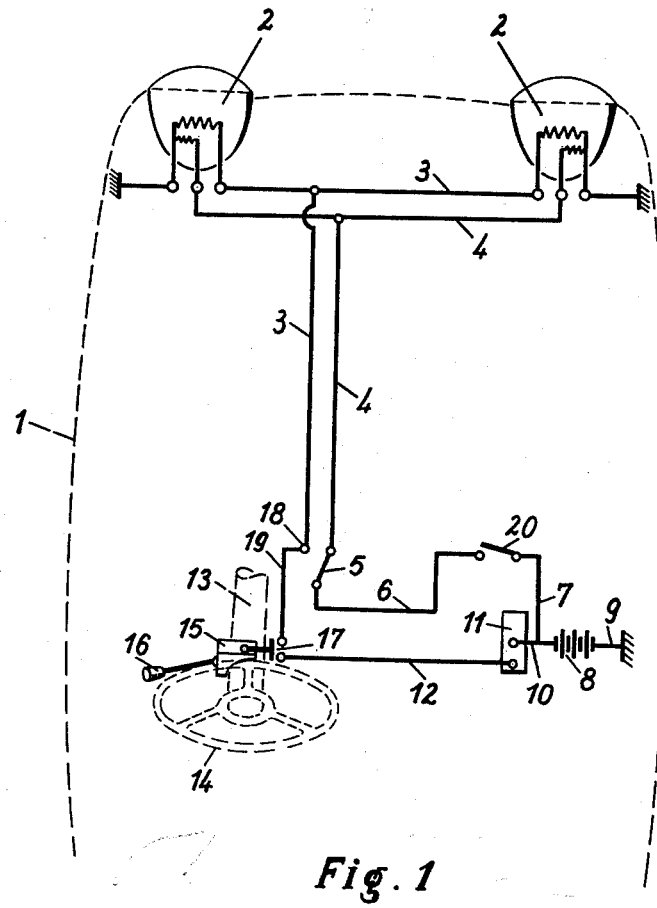
Figure 1a illustrates an alternate connection for the switching arrangement of Figure 1 to achieve blinking of high and low beams in the same signaling operation.

Referring now more particularly to the drawing, wherein like reference numerals are used throughout the various views to designate like parts, reference numeral 1 schematically indicates in Figure 1 the outline of the motor vehicle, shown in dotted lines, which is provided with two headlamps 2 in the front part thereof. Each headlamp is provided with two filaments, one filament corresponding to the upper or undimmed beam for country driving and the other filament corresponding to the lower or dimmed beam for city driving. The lower beams are connected to the battery 8 over wire 4, the dimmer switch 5, another wire 6, the main lighting switch 20 and another wire 7. The wire 7 connects with the positive terminal of the battery 8, the other terminal of which is connected to ground, i.e., to the frame or another metal part of the car, by wire 9.

Another wire 10 connects the positive terminal of the battery 8 with the flasher or blinking device 11 of the usual construction which repeatedly and automatically interrupts and closes again the electrical connection between wire 10 and wire 12 forming a series circuit with the flasher 11. The flasher unit or blinking device 11 may be of the constructional type as used for purposes of effecting, for example, the blinking of the directional signals. The wire 12 connects the blinking device 11 with one contact of blinking signal switch 15, which is arranged at the column 13 of the steering wheel 14 so that it may be easily reached by one of the driver's hands, and which, upon operating the lever 16, closes the contact 17 so as to connect the wire 12 with another wire 19 which connects the upper or undimmed beam of the headlights 2 via contact 18 of dimmer switch 5 and wires 3.

The mode of operation of the flasher-type light-signal emitting arrangement is as follows:

If the lighting system, i.e., the headlights are turned off or if the headlamps are at least dimmed when the main lighting switch 20 is turned on, then upon actuation of the blinking switch 15 the upper or undimmed beams of the headlights 2 are additionally energized upon closure of the contact 17 via wire 12, the light flasher or blinking device 11 and wire 10 so that the upper beams of the headlights 2 are automatically and intermittently turned on and off thereby producing the desired optical signals as long as the blinking switch 15 remains closed.

Figure 1A:
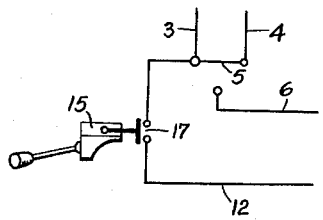

It is not necessary that the above-described flasher arrangement be operative only in connection with the upper or undimmed beams of the headlights 2 of the vehicle. It is also possible with simple means to cause the blinking switch 15 to operate selectively also either with the undimmed upper beams and the dimmed lower beams of the headlights 2, or, if so desired in certain cases, only with the lower beams of the headlights 2. In order that the blinking switch 15 be effective to control both the upper and the lower beams of both headlights for the same signaling operation, the switch 5 of Figure 1 may be so constructed and adjusted to connect wire 4 to wire 3 at terminal 18 as indicated in Figure 1a, both wires 3 and 4 being disconnected from the wire 6. This same adjustment of switch 5 is also possible to effect similar operation of both upper and lower beams in the circuit of Figure 2 described hereinafter.

Furthermore, the use of the light-signal flasher arrangement according to the present invention is not restricted to night-driving. In many cases, an optical signal produced by an arrangement in accordance with the present invention may also bring about a better result during daylight than is possible with acoustic signals. Moreover, it is also possible that optical receiving devices are provided in the vehicle driving ahead which also receive the optical signals reliably during the daytime, and which, for example, transform the optical signals into acoustical signals which may be heard in the driver's compartment.

Figure 2:
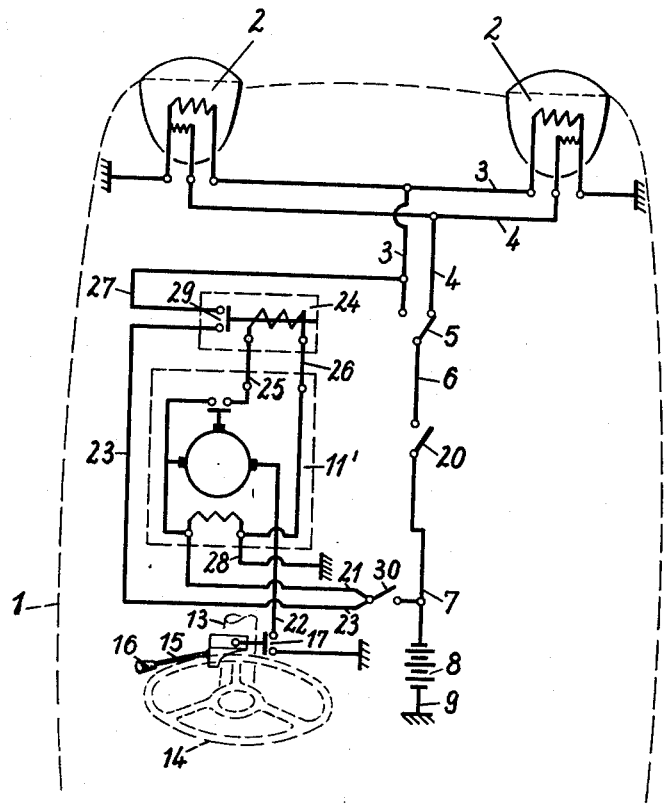
Figure 2 is a schematic illustration of another embodiment of the light-signal arrangement in accordance with the present invention.

Figure 2 illustrates a blinking device provided with an interconnected relay.

Again, the lower beams of the headlights 2 are connected to the positive terminal 7 of the battery 8 via wires 4, dimmer switch 5, wire 6, and main lighting switch 20. The other or negative terminal of the battery is again connected to ground so as to form a closed circuit through the frame of the vehicle with which the other ends of the filaments of the headlights are also connected.

The positive terminal 7 of the battery 8 is also connected with wires 21 and 23 via switch 30 which is appropriately turned on and off respectively together with the switch of the ignition circuit.

The contacts 17 of the blinking switch 15 which is again arranged at the steering column 13 of steering wheel 14, and which is actuated by lever 16, are connected to ground and via wire 22 to one side of the armature of the electric motor forming the blinking device 11' of this embodiment. The other side of the armature is connected to switch 30 via wire 21. The field of the motor, one side of which is connected to ground, is also energized over wire 21. A relay 24 is provided with a coil, one side of which is connected to ground via wires 26 and 28, while the other side thereof is connected to the wire 21 via wire 25 and a switch intermittently operated by the electric motor of the blinking device 11' during rotation thereof.

The upper beams of the headlights 2 are connected with the positive pole 7 of the battery 8 via wires 3, wire 27, contacts 29 of relay 24, wire 23 and switch 30.

The mode of operation of the arrangement according to Figure 2 is as follows:

Upon actuation of the blinking switch 15 the electric motor of blinking device 11' is energized from a positive terminal 7 of the battery 8 via switch 30, wire 21, the motor armature wire 22, contacts 17, the ground and back to battery over wire 9. Upon rotation of the electric motor the coil of the relay 24 will be intermittently energized thereby intermittently closing the contacts 29 whereby the upper beams of the headlights are intermittently energized.

While in the embodiment according to Figure 2, an electric motor has been shown as the blinking device, it is understood that instead of the electric motor, another blinking device may be used, for example, a flasher of the hot-wire or bimetal type. However, a blinking device should preferably be used which is connected in such a way that it causes relay 24 to act at once upon closing contact 17, i.e., that the blinking or flashing of the upper beams begins upon closure of contact 17.

Figure 3:
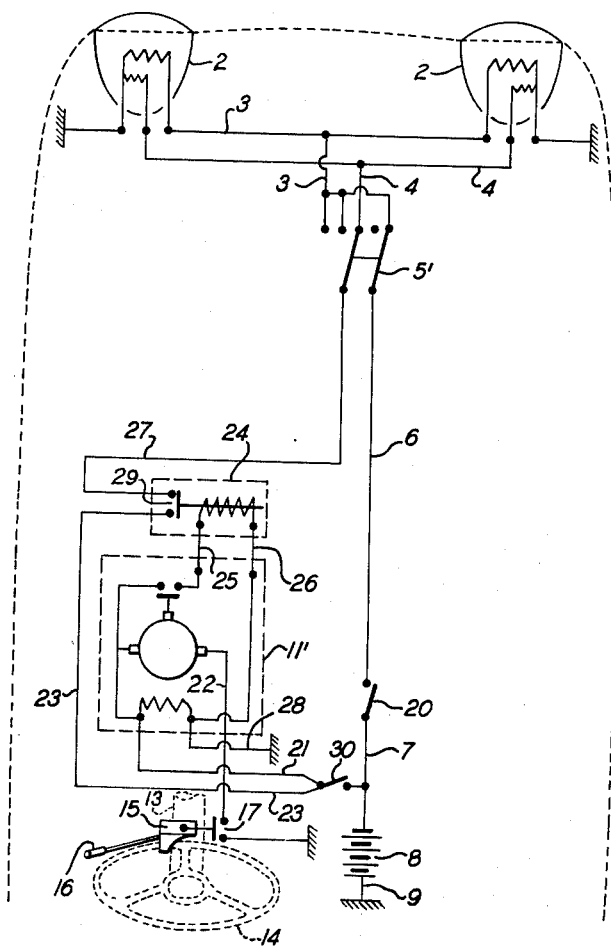
Figure 3 is a schematic illustration of another embodiment of the present invention.

The embodiment of the invention shown in Figure 3 is identical to that of Figure 2 except for the substitution of switch 5' for switch 5 of Figure 2. The switch 5' is a multiple-position switch that is suitable for selecting desired energized or signaling conditions for either the upper or the lower pairs of beams or both.

As illustrated in Figure 3, switches 5' and 20 are positioned to normally maintain both the upper and lower beams de-energized and switch 5' connects wires 4 and 27 for intermittent energization of the lower beam filaments alone under control of relay 24 and contacts 17 when the latter are closed for signaling, switch 30, of course, being closed. If desired, the switch 20 may be selectively closed by the driver to continuously energize the high beams while the lower beams alone are being used for signaling.

Figures 3A, 3B:
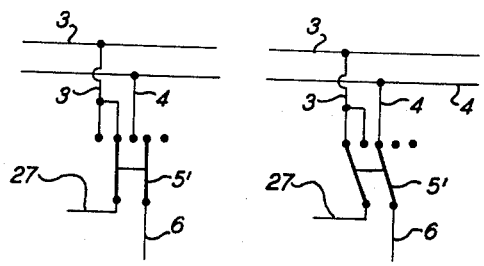
Figures 3a and 3b illustrate alternate positions of the switch 5' of Figure 3.

Figure 3a merely illustrates another position of switch 5' in Figure 3, the switch 5' being in an intermediate position in which both pairs of upper beam and lower beam filaments are normally off but the high beam filaments alone are connected to be intermittently energized by relay 24 over wire 27 through the contacts of switch 5' and wire 3.

In the third position of switch 5' shown in Figure 3b, the lower beam filaments may be energized continuously from wire 6 through the switch 5' and wire 4 by closing switch 20 whereas the upper beam filaments alone are again connected for intermittent energization under control of relay 24 by connecting wire 27 to wire 3.

What is claimed is:

1. In a motor vehicle with a pair of headlights each having upper and low beam means respectively, a source of power for said headlights, and automatic blinking means including a normally open signal switch selectively operable by the driver of the vehicle and circuit means for completing an energizing circuit from said power source to each of said upper and low beam means, respectively, for intermittently effecting in the same signaling operation energization of both of said beam means of each of said headlights from said source upon closure of said switch to emit light signals toward the preceding vehicle.

2. In a motor vehicle having a pair of headlights each provided with upper and lower beam means respectively, a control arrangement to provide a signal by simultaneously and intermittently energizing at least one beam means of each of said headlights comprising: a source of power for said headlights, switch means for selectively and continuously energizing either both of said upper or lower beam means respectively, and automatic blinking means including a normally open signal switch selectively operable by the driver of the vehicle for simultaneously and intermittently energizing that one of the two beam means of each of said headlights which is de-energized.

3. In a motor vehicle, a control arrangement according to claim 2 wherein said automatic blinking means including said normally open switch energizes only both of said upper beam means with said lower beam means either energized or de-energized.

4. In a motor vehicle, a control arrangement according to claim 2 wherein said automatic blinking means including said normally open switch energizes only both of said upper beam means with said lower beam means energized.

5. In a motor vehicle, a control arrangement according to claim 2 wherein said automatic blinking means including said normally open switch energizes only both of said upper beam means with said lower beam means de-energized.

6. In a motor vehicle, a control arrangement according to claim 2, wherein said automatic blinking means including said normally open switch energizes only both of said lower beam means.

7. The combination according to claim 2, wherein said switch means is operative to manually adjust said headlights to a plurality of different energization conditions including continuous energization of said upper beam means and of said lower beam means, and wherein said automatic blinking means energizes intermittently and simultaneously both of said upper beam means upon closure of said switch means in all but the position corresponding to continuous energization of said upper beam means.

8. The combination according to claim 2, wherein said motor vehicle includes a steering column, and wherein said normally open switch is provided on said column within easy reach of the driver's hand controlling the steering wheel.

References Cited in the file of this patent

UNITED STATES PATENTS

| | | |
|---|---|---|
| 2,186,911 | Erickson | Jan. 9, 1940 |
| 2,203,502 | Michel | June 4, 1940 |
| 2,655,642 | Ayres et al. | Oct. 13, 1953 |

FOREIGN PATENTS

| | | |
|---|---|---|
| 432,865 | Great Britain | Oct. 28, 1933 |
| 1,020,878 | France | Nov. 26, 1952 |